3,354,044
NUCLEAR REACTOR FUEL
John Archibald Law Robertson, Deep River, Ontario, Canada, assignor to Atomic Energy of Canada Limited, Ottawa, Ontario, Canada, a corporation of Canada
No Drawing. Filed Dec. 17, 1964, Ser. No. 419,226
Claims priority, application Canada, Oct. 10, 1962, 859.358
8 Claims. (Cl. 176—68)

This application is a continuation-in-part of our prior copending application Ser. No. 310,846, filed Sept. 23, 1963, and now abandoned.

The thermal conductivity of nuclear reactor fuels is an important consideration in the design of fuel elements. A high thermal conductivity is desirable since heat generation rates of the fuel elements can be increased to give high performance without exceeding core temperature limits. One fuel material commonly used is uranium dioxide by itself or mixed with other fuel materials (particularly other oxides). In the context of this application the term dioxide includes those of non-stoichiometric composition. The O/U ratio in uranium dioxide fuel is usually reduced during manufacture to below about 2.025, preferably to about 2.01 or less. This reduction is found to be desirable to obtain stable high performance. The use of an O/U ratio below 2 has not previously been advocated for fuel elements.

The thermal conductivity of uranium dioxide at elevated temperatures (e.g. above about 400° C.) has been found to be increased if the dioxide is treated to lower the O/U ratio to below 2 and give a hypostoichiometric dioxide. The basic crystalline structure of the dioxide is believed to be maintained after treatment, but the lattice network is deficient in oxygen. The additional component of thermal conductivity observed is believed to be due to electronic carriers (in addition to the lattice component). The overall thermal conductivity can be increased, by the process of the present invention, by a factor many times the basic lattice component.

This removal of oxygen may be accomplished by various suitable methods of which the following are examples:

(a) Heating the uranium dioxide material in a vacuum or in a low partial pressure of oxygen to cause a self-diffusion of oxygen from the material. The temperature may range from about 1500° C. to about 2200° C. A getter material may be inserted in the system to combine with the diffused oxygen. The getter should maintain a lower partial pressure of oxygen than that in equilibrium with stoichiometric $UO_2$ at the treatment temperature of the dioxide material.

(b) Associating with the uranium dioxide material a getter substance which will preferentially combine with oxygen. Suitable substances include the fuel metal itself (unoxidized) graphite, tantalum, molybdenum, tungsten, and mixtures thereof.

The getter may be at a higher or lower temperature than the dioxide material, the difference in temperature being selected to provide a suitable oxygen partial pressure—which allows control of the process. The above identified getter substances are elements or compounds which are in equilibrium with a suitable low partial pressure of oxygen, and which are stable at the operating temperatures. During subsequent handling and processing it is necessary to prevent re-oxidation of the hypostoichiometric uranium dioxide. Desirably, any later operations at elevated temperatures are carried out in the absence of oxygen, or a protective coating or atmosphere is maintained around the material. In some applications it may be desirable to assure the prevention of re-oxidation during prolonged use by associating a getter substance with the fabricated hypostoichiometric uranium dioxide.

The hypostoichiometric uranium dioxide may be defined as defect structure $UO_{2-x}$ where $x$ may range from above zero up to about 0.3 or more. Usually $x$ will have the value 0.01 to 0.1. For a given value of $x$, the increase in thermal conductivity over hyperstoichiometric dioxide is greater at higher temperatures—particularly over 1000° C.

The present invention is applicable to dioxides other than uranium alone, e.g., $UO_2$-$PuO_2$ mixtures, $UO_2$-$ThO_2$ mixtures, $ThO_2$-$PuO_2$ mixtures and $UO_2$-$ZrO_2$ mixtures. One oxide mixture particularly suited to the present invention is the $UO_2$-refractory $PuO_2$ mixture described in United States Ser. No. 213,035 filed July 27, 1962, now Patent No. 3,254,030, Michaud et al. The improved thermal conductivity of the dioxide matrix when treated according to the present invention, would decrease the homogenization of the $PuO_2$ particles.

The incorporation of the treated $UO_{2-x}$ material in nuclear reactor fuel elements would permit a considerably higher power generation (than for stoichiometric or hyperstoichiometric dioxide) for the same maximum operating temperatures. Alternatively, lower temperatures could be maintained in hypostoichiometric material for a given power generation.

Suitable fuel elements according to the present invention include:

(1) Those wherein at least all of the core of the fissionable material is initially a hypostoichiometric dioxide. Preferably the complete dioxide fuel is initially hypostoichiometric.

(2) Those wherein a stoichiometric or hyperstoichiometric dioxide is assembled in contact or proximity with a getter substance such as tantalum, uranium, or graphite so that at elevated operating temperatures the getter will extract and combine with oxygen and form hypostoichiometric dioxide in situ. For instance in cylindrical fuel elements the getter could be disc end plates or a central or axial core.

(3) Those wherein hypostoichiometric dioxide is used in conjunction with a getter in the manner of (2) above to assure maintenance of the hypostoichiometry.

An ideal thermoelectric material should have in addition to an optimum concentration of electronic carriers, (a) A high ratio of electronic to lattice components of thermal conductivity, and (b) The ability to operate over a large temperature range.

The treated $UO_{2-x}$ of the present invention satisfies all these requirements, having a very low lattice but high electronic component conductivity, and having also operating capabilities at temperatures over 2000° C. In contradistinction to many other thermoelectric materials the treated hypostoichiometric dioxide derived from material of standard commercial purity gives adequate performance. The $UO_{2-x}$ may be doped with further electronic carriers known in the semi-conductor art. A hypostoichiometric dioxide nuclear fuel could allow direct conversion of nuclear heat to electricity when incorporated in a thermoelectric circuit.

The following examples will serve to illustrate the invention.

*Example 1*

An uranium dioxide polycrystalline sinter (sintered in hydrogen at 1650° C.) having an O/U ratio of 2.005 was machined into cylindrical specimens of 3.5 mm. diameter and 12 mm. length. One of these cylinders was retained as control and one was heat treated in a closed furnace resistance heated by tantalum elements. The tantalum acted as getter and maintained an environment with a low partial pressure of oxygen around the cylindrical specimen. The specimen was heated at 2000° C. for one hour. Metallography (room temperature) revealed the presence of free uranium (about 1 vol. percent) in very finely divided form (about 1 micron) dispersed throughout the specimen indicating an O/U ratio of 1.98. At elevated operating temperatures it is believed that the free uranium effectively dissolves giving a continuous defect structure $UO_{2-x}$.

The thermal conductivity of the control and treated cylinders was compared by inserting them in equivalent positions in a graphite resistance heater rod and maintaining one end of each cylinder at the same elevated temperature. A fine thermocouple was set into a small hole at the other end of each cylinder. The furnace enclosure was evacuated so that heat gained by the specimens from the graphite rod was dissipated by radiation. The thermocouple output and also optical emissions were observed and gave measurements of the relative thermal conductivities. The treated specimen had consistently higher thermal conductivity by factors ranging upward from 1.4 over various temperatures ranging upward from 600° C. These results were confirmed by repeat runs.

*Example 2*

Fused crystalline $UO_2$ produced by arc fusion in an inert atmosphere was studied metallographically at room temperature and the presence of free uranium observed. This hypostoichiometric material was divided into two specimens, one of which was annealed in moist hydrogen for about one hour at 1650° C. Subsequent metallography (room temperature) showed that the free uranium had been removed by this treatment without otherwise changing the structure. These two specimens were then compared in the thermal conductivity apparatus described in Example 1. It was again found that the hypostoichiometric specimen had the higher conductivity—by the same amount as in Example 1.

*Example 3*

Hypostoichiometric compositions were also produced from stoichiometric or hyperstoichiometric sinters using graphite instead of tantalum. The graphite was used in a vacuum furnace providing continuous removal of the gaseous by-products. The hypostoichiometric composition having improved thermal conductivity was obtained both when the dioxide material being treated was in solid contact with the graphite, and when they were separated. Mixtures of tantalum and graphite have also been found to be effective getters.

An effective furnace treatment has been carried out on sintered stoichiometric pellets of $UO_2$ (0.75 inch in diameter by 0.75 inch long) by holding for two hours at 2000° C. in a vacuum. The furnace was continuously evacuated, providing a vacuum of better than $10^{-5}$ mm. Hg at room temperature, but the pressure increasing rapidly during operation. The heating elements were tantalum and the pellets were in a graphite crucible. After the two-hour treatment, sample pellets were analyzed by controlled ignition to $U_3O_8$ and were found to have O/U atomic ratios of 1.99.

*Example 4*

In order to illustrate the thermoelectric properties of hypostoichiometric $UO_2$ determinations of the Seebeck co-efficient $\alpha$ were made on material effectively quenched from elevated temperatures. The thermoelectric measurements were made in a standard 4-probe apparatus for measuring electrical resistivity, but with a heater in contact with one electrode to maintain a temperature differential across the specimen. The following approximate values were found at room temeprature for various O/U atomic ratios:

| O/U: | $\alpha(\mu v./° C.)$ |
|---|---|
| 1.999 | −690 |
| 1.995 | −400 |
| 1.993 | −790 |
| 1.992 | −700 |
| 1.990 | −840 |

The Seebeck coefficients of metals range from very small values to about 80 microvolts per degree, of semi-conductors from about 50 to 1000 and of many materials specially developed for thermoelectric applications from about 100 to 400 microvolts per degree. These latter values represent a compromise between desirable higher values for $\alpha$ and desirable electrical resistivities and thermal conductivities. The negative value obtained for $\alpha$ signifies that hypostoichiometric uranium dioxide is an n-type conductor, as opposed to the p-type hyperstoichiometric material. It is believed that hypostoichiometric $UO_2$ will most likely be used in thermoelectric applications in the temperature range 500–2000° C.

*Example 5*

In this example an irridation experiment was carried out to compare the thermal conductivity and thermoelectric properties of hypo- and hyper-stoichiometric uranium dioxide. Geometrically similar elements containing hypo-($UO_{1.98}$) and hyper-stoichiometric ($UO_{2.007}$) uranium dioxide of identical enrichment were irradiated side-by-side at three flux levels for a comparison of the effective thermal conductivities and thermoelectric properties. Each element had a molybdenum-sheathed, central thermocouple (w./w.—26% Re). This was electrically insulated from the fuel element sheath, permitting a measurement of central temperature, thermoelectric EMF and electrical resistance from fuel centre to sheath.

The post-irradiation inspection of the nine elements from this charge showed no evidence of micro-structural change on fractured cross-sections, an observation consistent with the thermal history.

The hypostoichiometric elements had lower central temperatures throughout the irradiation. The difference between the two compositions, about 50° C. at the start, had increased to about 300° C. at a temperature of 1500° C. by the end of the 27-day irradiation. There was an apparent gradual decrease in the effective thermal conductivity of the $UO_{2.007}$ fuel, which behaved as a "p" type semi-conductor throughout the irradiation. Initially the $UO_{1.98}$ was n-type at low temperatures, but after a short annealing period it was "p" type below a temperature of about 600° C., and "n" type above this temperature. The electrical resistance readings were variable, but the $UO_{1.98}$ had consistently smaller values at any given central temperature. The maximum potential developed between central probe and sheath by either hypo- or hyper-stoichiometric material was about 400 mv. and occurred for upper temperatures around 1300° C.

This experiment has established:

(1) Significant benefit by virtue of lower fuel temperatures can be obtained from the use of hypostoichiometric $UO_2$ in conventional reactor applications.

(2) The benefit persists, and may even increase, during irradiation to the maximum exposure yet tested of $10^{19}$ fissions/cm.$^3$.

(3) Appreciable thermoelectric EMF's are obtainable from both hypo- and hyper-stoichiometric $UO_2$ under temperature conditions normal in fuel element applications. Most important, at elevated temperatures the polarities are of opposite sign so that the EMF's of the two combined in a cell would be additive.

(4) The thermoelectric EMF's persist during irradiation.

Thermoelectric devices operating at above about 600° C. may advantageously use thermoelectric generators comprising both n-type hypo- and p-type hyper-stoichiometric dioxide material selected from the group uranium, plutonium, thorium, and mixtures thereof.

In other experiments batches of uranium dioxide pellets heated in a vacuum at 2000° C. in the presence of graphite (but not in contact with it) analyzed $UO_{1.97}$ to $UO_{1.99}$, but material losses of the uranium dioxide of the order of 5 wt. percent occurred (due to volatilization). In order to overcome this difficulty the sintered $UO_2$ pellets may be coated with carbonaceous materials and reduced to hypostoichiometry at temperatures well below 2000° C. In the following examples sintered $UO_2$ pellets were coated with graphite from a dispersion of colloidal graphite in alcohol.

*Example 6*

$UO_2$ pellets of 0.75 in. diameter and 0.75 in. length were coated with colloidal graphite in alcohol and dried in air at 80° C., the coating process being repeated as often as necessary to obtain the required thickness (weight) of coating. Annealing was then carried out at 1830–1840° C. for three hours in a vacuum of $10^{-4}$ to $10^{-5}$ torr. Analysis was by weight change on oxidation of samples to $U_3O_8$ at 900° C. With a graphite coating of 0.15 weight percent, an O/U ratio of 1.981 and a carbon content of less than 20 p.p.m. was obtained. With a coating of 0.25 wt. percent graphite, an O/U ratio of 1.977 and a carbon content of less than 20 p.p.m. were obtained. With a coating of 0.35 wt. percent, and O/U ratio of 1.973 was obtained. Above about 0.8 wt. percent, an O/U ratio of 1.973 was obtained. Above about 0.8 wt. percent graphite the retained carbon content becomes significant (greater than about 100 p.p.m.). Tests with 1 and 2 wt. percent graphite yielded O/U ratio of 1.910 and 1.820 respectively, but the carbon contents were 140 and 15,000 p.p.m. respectively with large globules of uranium metal appearing on the pellet surfaces.

*Example 7*

The effect of annealing temperature has been investigated on 0.75 in. diameter $UO_2$ pellets coated with 0.25 wt. percent graphite, and vacuum annealed at various temperatures for three hours. The results are summarized in the following table.

| Annealing temp. ° C.: | O/U ratio |
|---|---|
| 1400 | 2.009 |
| 1600 | 1.987 |
| 1830 | 1.979 |
| 1840 | 1.978 |
| 1850 | 1.976 |
| 1880 | 1.977 |
| 1900 | 1.974 |

The O/U ratio begins to level off at about 1.975 in the temperature range 1850–1900° C. It is not desirable to use temperatures much above 1900° C. since material loss by volatilization becomes significant and a regular pellet shape cannot be maintained.

*Example 8*

The effect of pellet diameter at a graphite coating level of 0.25 wt. percent and constant time and temperature, is as follows:

| Pellet diameter, in.: | O/U ratio |
|---|---|
| 0.25 | 1.980 |
| 0.56 | 1.976 |
| 0.75 | 1.981 |
| 1.4 | 1.973 |

The O/U ratio falls slightly at higher pellet diameters. This may be due to a smaller loss by volatilization, oxidation, etc. since the coating is thicker on the larger pellets.

*Example 9*

In this example a coating of carbon was obtained on pellets by vapour deposition. Carbon was vapourized in a vacuum and allowed to deposit as a very thin layer on the surface of a sintered $UO_2$ pellet. The pellet was then annealed in vacuum at 1840° C. for three hours. Metallographic examination indicated the presence of free uranium uniformly dispersed throughout the pellet cross-section, and chemical analysis gave an O/U ratio of 1.989.

The methods of Examples 6 to 9 provide uniform lowering of the O/U ratio throughout the pellet, i.e., although the reaction is at the surface, diffusion rates appear rapid enough to equilibrate the composition in less than three hours. This also indicates that $UO_{2-x}$ is a single phase at elevated temperatures, at least down to the values of $2-x$ tested. This coating and annealing technique for producing the hypostoichiometric material is readily adaptable to large scale production, and may be carried out at temperatures down to about 1500° C. Other forms of carbon may be used for the coating, which is desirably less than about 0.8 wt. percent, more preferably 0.1 to 0.5 wt. percent of the pellet.

To demonstrate that the present invention is not restricted to uranium dioxide but is applicable to dioxide materials comprising crystalline dioxides of uranium, plutonium, thorium, and mixtures thereof the following example is provided.

*Example 10*

Sintered pellets of pure thorium dioxide and thorium dioxide plus 2 wt. percent uranium dioxide were coated with 0.25 wt. percent colloidal graphite and annealed in vacuum at 1840° C. for three hours giving a hypostoichiometric material in each instance.

*Example 11*

This example illustrates how the hypostoichiometric defect crystalline composition can be formed in situ during operation of a nuclear reactor.

The fuel metal (uranium, plutonium, or thorium) is arranged as a metal member in contact with the fuel elements made from the corresponding hyperstoichiometric dioxide as for example a core therein, a sheath thereabout, end plates thereon or even as buttons in cavities at the ends of the pellet. A nuclear reactor is then fueled with such pellets and operated and in so doing the fuel elements are heat treated at a temperature above about 1500° C. under deoxygenating conditions. The fuel elements become at least partly converted to a hypostoichiometric state. The hypostoichiometric state is maintained during continued operation of the reactor.

To demonstrate the feasibility of the above in situ technique, the sintered pellets of stoichiometric $UO_{2.00}$ were drilled in the center of one end face to accept a piece of 1/8 in. diameter uranium wire, about 1% by weight of the pellet. Sample pellets were annealed for three hours in 0.5 atm. of static argon at several temperatures with the following results:

| Pellet | Temp. (° C.) | Final O/U Ratio | Observations |
|---|---|---|---|
| 1 | 1,400 | 2.006 | Little free U. |
| 2 | 1,600 | 1.995 | More free U than 1. |
| 3 | 1,800 | 1.986 | Much more free U than 1, 2. |

In all pellets, free uranium was observed throughout the sample, indicating that a homogeneous composition was obtained. Thus the method is useful for preparing $UO_{2-x}$ compositions in the laboratory (or in a production plant). Of more significance, however, is the fact that stoichiometric $UO_2$ in contact with U metal could be converted to $UO_{2-x}$ in an operating fuel element since in contrast to other methods, no contaminating gaseous or solid reaction products occur. Although conversion would probably be confined to the region of the fuel in the temperature range where $UO_{2-x}$ is monophasic, it is believed that only in this region does the reduced composition confer any increase in thermal conductivity. Thus there is no reason why fuel prepared in the manner of this example should be inferior in behaviour to fuel of uniform composition $UO_{2-x}$ prepared out-of-reactor.

The unoxidized fuel metal (uranium, plutonium or thorium) may be assembled in the fuel element in contact with the hyperstoichiometric dioxide (e.g. as cores, sheaths, end plates, buttons in cavities and ends of pellets) to result in the hypostoichiometric dioxide in situ.

What is claimed is:

1. A method of improving the properties of a nuclear reactor fuel element, the fuel therefor comprising initially a shaped ceramic mass of a hyperstoichiometric dioxide of a metal selected from the group consisting of uranium, plutonium, thorium and mixtures thereof, and a deoxygenating getter metal selected from the group consisting of thorium, uranium, plutonium, tantalum, molybdenum, tungsten and mixtures thereof, which comprises heat treating the shaped hyperstoichiometric dioxide mass and getter metal at a temperature of above about 1500° C. under at least substantially oxygen-free deoxygenating conditions, until at least part of said dioxide mass becomes hypostoichiometric the oxygen to metal ratio of said dioxide mass being reduced to below 2.0 but above 1.90, the assembled fuel element including said so treated dioxide mass and getter metal.

2. The process of claim 1 wherein the heat treatment is effected in situ in a nuclear reactor, and wherein the dioxide in said fuel element is maintained in hypostoichiometric state during continued operation of the reactor by presence of the getter metal.

3. The method of claim 1 wherein the getter metal is present as a central insert in said shaped ceramic mass.

4. The process of claim 1 wherein the fuel is uranium dioxide and the getter metal is uranium.

5. The method of claim 1 wherein the heat treatment is effected at a temperature in the range of 1500° C.–1900° C.

6. A nuclear reactor fuel element in which the fuel therein comprises a shaped ceramic mass of a hypostoichiometric dioxide of a metal selected from the group consisting of uranium, plutonium, thorium and mixtures thereof, the fuel element including a getter metal selected from the group consisting of thorium, uranium, plutonium, tantalum, molybdenum, tungsten and mixtures thereof associated with said shaped ceramic mass.

7. The fuel element of claim 6 wherein the getter metal constitutes a central insert in said shaped ceramic mass.

8. The fuel element of claim 6 wherein the oxygen to metal ratio is less than 2.0 but above 1.90.

References Cited

UNITED STATES PATENTS

| | | | |
|---|---|---|---|
| 3,067,116 | 12/1962 | Kittel et al. | 176—91 X |
| 3,141,829 | 7/1964 | Fortescue et al. | 176—37 X |
| 3,166,614 | 1/1965 | Taylor | 176—91 X |

OTHER REFERENCES

AECD, BMI-1135, The Electrical Properties of Uranium Oxides. September 1956, page 37.

AECD, HW-75120, Electrical Properties of Plutonium Oxides, September 1962, pages 10, 13 and 14.

Aitken et al., Characteristics of Substoichiometric Urania ($UO_{2-x}$) at Elevated Temperatures, vol. 6, Amer. Nuc. Soc. Trans., 1963, pp. 153–154 (TK 9001A54).

Duncan et al., "Preparation and Properties of Hypostoichiometric Uranium Dioxide," vol. 6, American Nuclear Society Transactions, 1963, pp. 154–155 (TK 9001A54).

Katz et al., "The Chemistry of Uranium," Part I, McGraw-Hill Book Co., Inc., 1951, pp. 250–252.

Rothwell, High Temperature Substoichiometry in Uranium Dioxide, United Kingdom Atomic Energy Authority Research Group Report, December 1961, pages 1–7.

CARL D. QUARFORTH, *Primary Examiner*.

BENJAMIN R. PADGETT, L. DEWAYNE, RUTLEDGE, *Examiners*.

S. TRAUB, R. L. GRUDZIECKI, *Assistant Examiners*.